United States Patent
Pellen

(10) Patent No.: US 8,130,101 B2
(45) Date of Patent: Mar. 6, 2012

(54) EMBEDDED POWER CABLE SENSOR ARRAY

(75) Inventor: Alain Pellen, Boca Raton, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 375 days.

(21) Appl. No.: 12/408,834

(22) Filed: Mar. 23, 2009

(65) Prior Publication Data

US 2010/0238020 A1    Sep. 23, 2010

(51) Int. Cl.
    *G08B 13/12* (2006.01)
(52) U.S. Cl. ............... 340/568.2; 340/870.01; 340/680
(58) Field of Classification Search ............... 340/568.2, 340/501, 505, 853.1, 854.3, 854.9, 853.2, 340/870.01, 679–680
    See application file for complete search history.

(56) References Cited

U.S. PATENT DOCUMENTS 5,808,557 A * 9/1998 Berge et al. ............... 340/870.01
(Continued)

FOREIGN PATENT DOCUMENTS

CN    1598974    3/2005
(Continued)

*Primary Examiner* — Daniel Previl
(74) *Attorney, Agent, or Firm* — Whitham, Curtis, Christofferson & Cook, P.C.

(57) ABSTRACT

Semiconductor sensor chips are assembled with semiconductor communication chips to form sensor nodes which are wired together and placed in a tube preform which is sealed to form a tube containing an array of sensor nodes. The tube, resembling a wire in appearance, can then be assembled with power conductors to form a power delivery cable to allow monitoring of conditions within the cable at a plurality of spaced locations along the length of the cable so that the cable can be operated near or at its actual current carrying capacity which may be altered by ambient conditions and allowing management of risk of failure of the cable.

22 Claims, 10 Drawing Sheets

U.S. PATENT DOCUMENTS

| | | | |
|---|---|---|---|
| 5,831,542 A * | 11/1998 | Thomas et al. | 340/684 |
| 5,860,316 A * | 1/1999 | Berrill | 73/304 C |
| 6,167,525 A * | 12/2000 | Donazzi et al. | 361/93.8 |
| 2008/0042856 A1* | 2/2008 | Power | 340/575 |
| 2009/0140879 A1* | 6/2009 | Kamata et al. | 340/853.2 |
| 2009/0259412 A1* | 10/2009 | Brogardh | 702/41 |

FOREIGN PATENT DOCUMENTS

| | | |
|---|---|---|
| FR | 2687830 | 8/1993 |
| JP | 1063825 | 3/1989 |
| JP | 3107735 | 5/1991 |
| JP | 2002310808 | 10/2002 |

* cited by examiner

EMBEDDED POWER CABLE SENSOR ARRAY

BACKGROUND OF THE INVENTION

1. Field of the Invention

The present invention generally relates to the design, manufacture and operation of cables for delivery of electrical power and, more particularly, to power cables for special applications where power cables must be operated over a wide variety of environmental conditions or at or near actual power delivery capacity.

2. Description of the Prior Art

The variety of environments and circumstances where delivery of electrical power over a significant distance through a cable is required has expanded virtually without limit, particularly in recent years. Many such applications present relatively stable operating conditions and common characteristics of cable installation such as power distribution wiring in buildings, power lines, manufacturing facilities (where the environmental conditions may be particularly harsh but are largely consistent over time), appliances, computers (including large installations), instrumentation, hospitals (which may include installations of apparatus with high and intermittent power consumption), ships, aircraft and the like. In general, where the demand is adequate to support volume production and sales, special types, designs and/or grades of wiring have been developed to satisfy most applications at the present time. Such cable designs often incorporate built-in design margins for anticipated operating or environmental conditions such as specification of a minimum wire gauge for a given current-carrying requirement, particular insulation materials for use in the vicinity of heat sources and/or high temperatures or particular structural properties to resist attack by ambient materials or damage from mechanical forces.

The current carrying capacity (sometimes referred to as "ampacity") of electrical power cables is generally limited by allowable internal temperature rise due to heat generated by ohmic losses (sometimes referred to as "copper losses" regardless of the material from which the cable is made or, infrequently, "aluminum losses" or the like) due to electrical resistance in the cable and the ability of insulation to withstand such internal temperature rise. In addition to the bulk electrical resistance of the cable conductor material, electrical resistance may also be altered by temperature, static and dynamic forces applied to the cable and other mechanical effects (e.g. distortion, metal fatigue and the like) which may locally or globally damage sections of the conductor. Plastic insulation, in particular, which is in direct contact with a hot conductor may be partially or fully melted or may exhibit early loss of dielectric properties at high temperatures potentially causing internal short-circuiting and cable failure. Built-in design margins referred to above are largely directed to guaranteeing that temperatures at which cable degradation can occur are not reached or even approached over a wide range of installation conditions (including foreseeable damage incident thereto) and operating environments for the current loads for which the cable is designed. When standard cable designs having such built-in design margins cannot be used, particularly in high-performance applications such as where size or weight presents severe design constraints or so-called reeled applications where the cable is used while wound on a spool presenting many layers that retain and concentrate generated heat, predicting the temperature rise for all possible conditions can be difficult and can lead to conservative design and unused capacity with the corresponding costs and inefficiencies.

However, many more applications exist where the operating environment is much more variable and the cable design more critical and where built-in design margins cannot be observed. It should be recognized that built-in design margins necessarily carry a cost and inherent inefficiency because the built-in design margins provide additional power-carrying capacity which is not used. Conversely, optimization of a power cable can result in major overall savings in cable cost and size and cost of equipment for handling the cable. For example, in machinery used for marine, underwater applications, optimization of cable size and weight may be reflected not only in the machinery for directly handling the cable but throughout most of the vessel, including the ultimate size thereof. On the other hand, optimization of cable design essentially is an exercise in lowering design margins in regard to temperature, mechanical stresses including flexure, damage or the like and general cable operating conditions as much as possible, thus, in such circumstances as in this example, increasing the risk of failure offshore where the costs attributable to a failure can be enormous. At the present state of the art, one way to limit the risk of such failure has been to design additional current-carrying capacity and other protective structures into the cable even though the cost and inefficiency of doing so can also be quite large. For many applications, the costs of providing excess but unused capacity or internal structures in electrical power delivery cables may significantly increase their size and weight or compromise other desirable properties such as flexibility and the risk and attendant costs of cable failure must be carefully managed.

Embedded fiber optic sensors are sometimes used to monitor cable temperature but such sensors are proprietary and subject to errors and other physical effects such as cable strain. Determining cable temperature by a measurement of wire resistance is not practical since delivery of power must be interrupted to make the measurement and only provides an average temperature rise measurement for the entire cable while a common failure mode involves localized overheating in a possibly relatively short portion of a very long cable.

SUMMARY OF THE INVENTION

It is therefore an object of the present invention to provide an electrical power delivery cable having embedded sensors therein for monitoring conditions at a plurality of locations within a cable of arbitrary length.

In order to accomplish these and other objects of the invention, a sensor array and a cable containing such a sensor array are provided wherein the sensor array comprises a tube and a plurality of sensor nodes spaced from each other along a length of the tube; the sensor nodes being connected by wires for carrying signals to and from sensor nodes and providing power to sensor nodes, wherein each sensor node includes a semiconductor condition sensor chip and a semiconductor communication chip.

In accordance with another aspect of the invention, a method of making a sensor array for monitoring a condition of a cable is provided comprising steps of installing wires for carrying signals to and from sensor nodes and providing power to sensor nodes in a tube preform, withdrawing a portion of the wires from the wire preform, attaching terminals of a sensor node to the wires cutting the wires between said terminals of the sensor nodes, placing the sensor node and the wires within the tube preform, and sealing the tube preform to form a tube containing the sensor node and the wires.

In accordance with a further aspect of the invention, a method of managing risk of failure of a power delivery cable is provided comprising steps of passing an electrical current through the power delivery cable, monitoring at least two of temperature, acceleration, strain, material incursion and magnetic field at a plurality of locations in the power delivery cable using a semiconductor sensor chip at each location, communicating results of the monitoring step using electrical signals communicated by a semiconductor communications chip at each location, and reducing the electrical current in the power delivery cable in accordance with a parameter measured in the monitoring step.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
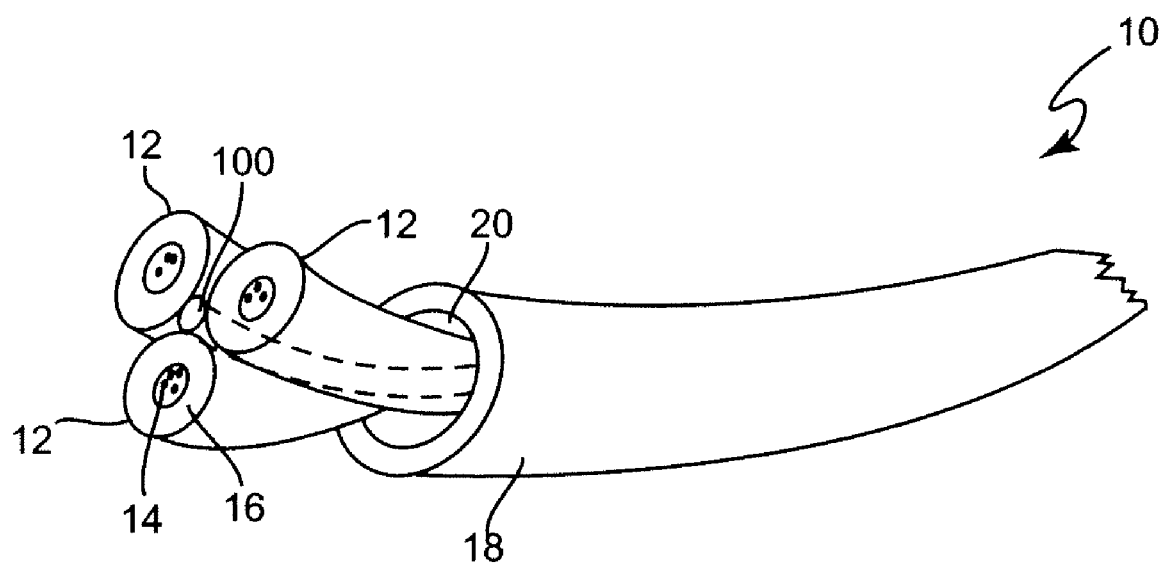
FIG. 1A is an isometric view of a length of cable including a temperature sensor array in accordance with the invention.

Referring now to the drawings, and more particularly to FIG. 1A, there is shown a section of an electrical power delivery cable 10 (hereinafter sometimes simply "cable") with embedded sensors in accordance with the invention. The cable 10 includes a plurality (generally at least two but usually three, as shown, but as many such wires as desired may be included) of insulated wires 12 where the conductor 14 (which may be solid or comprised of a plurality of smaller strands) is generally of copper or aluminum, copper plated or sheathed aluminum or the like but the material chosen is of no importance to the successful practice of the invention. Each of these wires 12 includes electrical insulation layer 16 covering conductor 14 and the illustration thereof should be considered as including any additional structural feature(s) that may be desired for the particular application in which cable 10 is to be employed. Such additional structural features may include, without limitation, mechanical or electrical shielding, tension-bearing reinforcement or the like which may, in some cases, be included within the conductor 14. The wires 12 are then preferably enclosed in a cable sheath or outer jacket 18. Any space 20 between the wires 12 and outer jacket 18 can be left empty or filled with a fluid, elastomer or wrapping or other desired structure. Structural features such as mechanical and/or electrical shielding and/or reinforcement (e.g. to carry axial loads), as alluded to above, may be included in outer jacket 18, as may be desired and the depiction of jacket 18 should be understood to so illustrate.

Figure 1B:
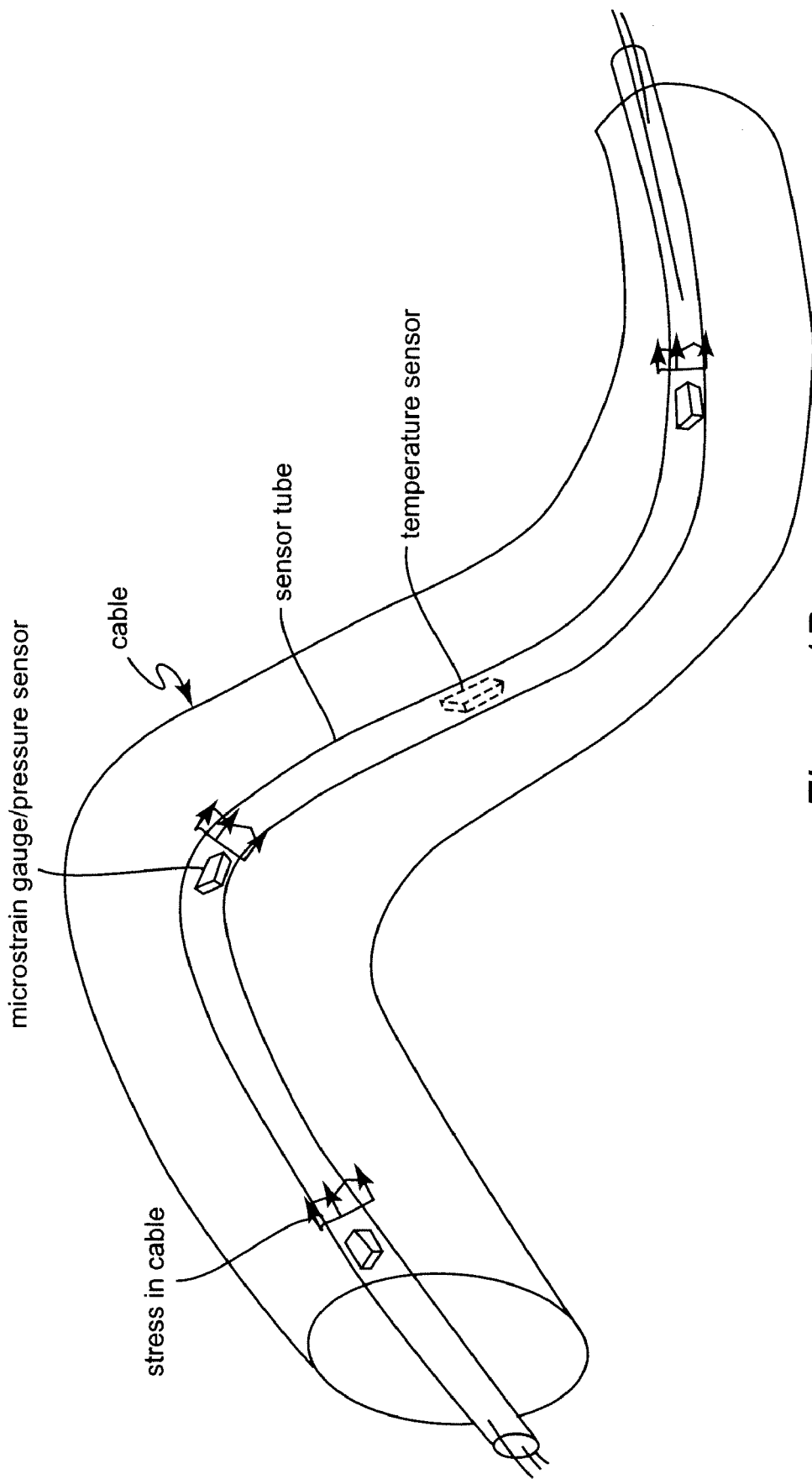
FIGS. 1B and 1C are depictions of cables in accordance with the invention including pressure/strain sensors and accelerometers respectively, and which are representative of sensors for additional conditions.

In accordance with the invention, cable 10 includes a sensor array tube 100 which is preferably placed among wires 12 or within the space between wires 12 and extends along the power conductors 12 within the cable, preferably for the entire length thereof. As will be discussed in greater detail below, the sensor array tube 100 can be held to a diameter of 3 mm or less and resembles a wire in outer appearance. Thus the sensor tube 100 will fit within the space formed between wires or take the place of a wire in a multi-wire cable. For example, as in FIG. 1A, in a three-wire cable 10 having wires 12 of about 3 mm diameter or greater approximately corresponding to a wire gauge of 16 AWG with plastic insulation a sensor tube 100 of approximately the same diameter can be used. Some exemplary cable cross-sections suitable for practice of the invention are illustrated in FIG. 1D. Generally, cables in which the present invention may be advantageously employed will require use of wires 12 That are about the 3 mm diameter of the sensor tube 100 or larger.

Figure 2A:
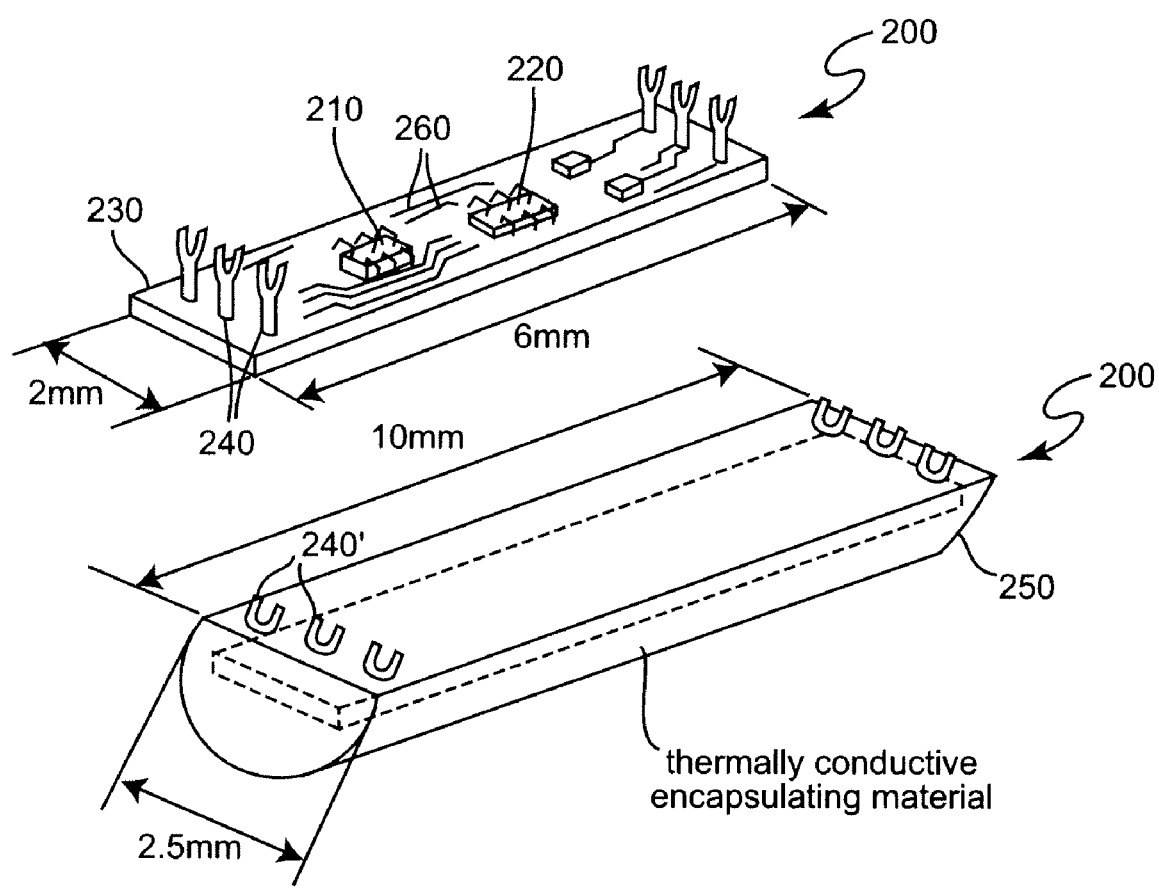
FIG. 2A illustrates a preferred construction of a sensor module or node that may be employed in the invention.

Referring now to FIG. 2A, a generic sensor module structure 200 (illustrated both with and without encapsulation and sometimes referred to hereinafter as a sensor node) for deployment of sensors in sensor tube 100 will be discussed. It should be appreciated that such sensors suitable for deployment in connection with a cable are known for purposes of telemetry of environmental conditions such as in well-drilling applications but not for monitoring conditions within a cable, itself, particularly an electrical power delivery cable. As alluded to above, sensing temperature within a cable has been achieved by distributed fiber optic sensors which are proprietary, generally unsuited to short cable lengths and sensitive to other physical parameters other than temperature. (Discrete fiber optic sensors are not suitable for practice of the invention since they are not addressable other than over discrete optical fibers.) Distributed fiber optic sensors that are potential candidates for monitoring internal cable conditions at a plurality of locations are 1.) a proprietary distributed fiber optic sensor using a standard optical fiber and monitoring of optical energy losses and internal Brillouin and/or Raman scattering effects that change with temperature and which is expensive, not suitable for relatively short cables (e.g. ten meters or less) as resolution along the cables is several meters and at least 50 meters of launch cable is needed to obtain reliable data and may be sensitive to strains in the fiber) and 2.) a fiber Bragg grating in which periodic variations of the refractive index is inscribed into the optical fiber at intervals along the length thereof (which requires expensive special optical fibers and expensive electronics including proprietary decoding hardware while also being inherently subject to errors due to strain in the fiber.

In sharp contrast with known fiber-optic types of sensors, the invention preferably uses commercially available digital sensors and components which are fabricated as integrated circuit chips or dies and thus can be of very small dimensions. Typically, only two such dies will be required at each location to be monitored for a given condition. If more than one parameter is to be monitored at a given location, additional sensor dies can be included in a sensor module. However, since it is seldom necessary to simultaneously monitor different parameters at the same location or locations within a few millimeters of each other, it is generally more convenient to monitor additional conditions from separate discrete sensor modules which can be placed very close to each other along the length of sensor tube 100 and which can be separately discriminated or addressed. Such deployment of discrete sensor modules avoid many complications such as conflicting digital codes for data or control and addressing. Should it be necessary to simultaneously monitor different conditions at precisely the same location, such potential problems in discrimination of data, coding, addressing and the like could probably be better addressed using an application specific integrated circuit rather than adding more discrete sensor chips in the same sensor module.

Thus, for most applications, it will be sufficient to include only a single sensor chip or die 210 and a single communications chip or die 220 in a sensor module 200. These dies are preferably about 1.0 mm or less in width and thus can be mounted on a substrate plate 230 which is 2.0 mm or less in width. Such a width for substrate plate 230 serves to locate the sensor chip 210 mounted on its surface at the approximate center of a tube 100 having an outer diameter of about 3.0 mm and an inner diameter of about 2.7 mm if the substrate plate 230 bears on the inner surface of the tube 100 or is only slightly separated therefrom by encapsulation material. The length of substrate plate 230 can generally be held to about 6.0 mm or less but the length is not critical to the successful practice of the invention. In general, the substrate plate 230 should be held to a sufficiently short length to avoid damage to substrate 230 by normal cable flexure or, conversely, to avoid stiffening the cable. On the other hand, if the amount of cable flexure or the like is a desired parameter to be monitored, a length appropriate to the sensor may be used in conjunction with a substrate 230 of a flexible or resilient material. Also mounted on the substrate plate are a minimum of six upright, stand-off type wire terminals which are preferred to other connection structures such as wire bond pads which could be used because their height allows the portion 240' of the terminals to be attached to wires in the sensor tube 100 to protrude from the encapsulation material after the encapsulation 250 is applied. The remainder of the geometry and shape of the wire terminals 240 is unimportant to the successful practice of the invention. The substrate plate has connections 260 formed thereon to connect the wire terminals 240 to the sensor and communication dies 210, 220.

Once the sensor and communication dies 210, 220 and wire terminals 240 are installed on substrate plate 230 and testing performed, if desired, encapsulation material can be applied to form a seal and protective barrier around the operative parts of the sensor module. All construction of the sensor node should be performed in a clean room to avoid contamination of the chips before encapsulation is substantially complete. After encapsulation, the sensor nodes are extremely robust and not subject to damage by environments suitable for manufacture of the sensor array or the completed cable as will be discussed below. The encapsulation material can be any material which does not significantly compromise the condition to be monitored. That is, for temperature monitoring, the encapsulation material should be thermally conductive; for pressure or strain monitoring, the encapsulation material should be flexible and elastic and so on as necessary to communicate the parameter to be sensed to the sensor chip.

It is preferred that the shape of the encapsulation 250 be generally cylindrical with one side flattened only to the extent necessary to allow wire terminal portions 240' to protrude therefrom and, in cross-section, should conform to and substantially fill more than half of the interior cross-section of tube 100 so that the sensor module is firmly supported therein to enhance conduction of heat, strain, pressure, acceleration, etc. from the exterior of tube 100. When the sensor array is finally assembled in tube 100, the space formed by the flat side of the sensor node and the space between sensor nodes is preferably filled with a gel, elastomer plastic or the like which can serve to further protect the sensor nodes and wires against damage and enhance the communication of conditions of interest to the sensors.

Figure 2B:
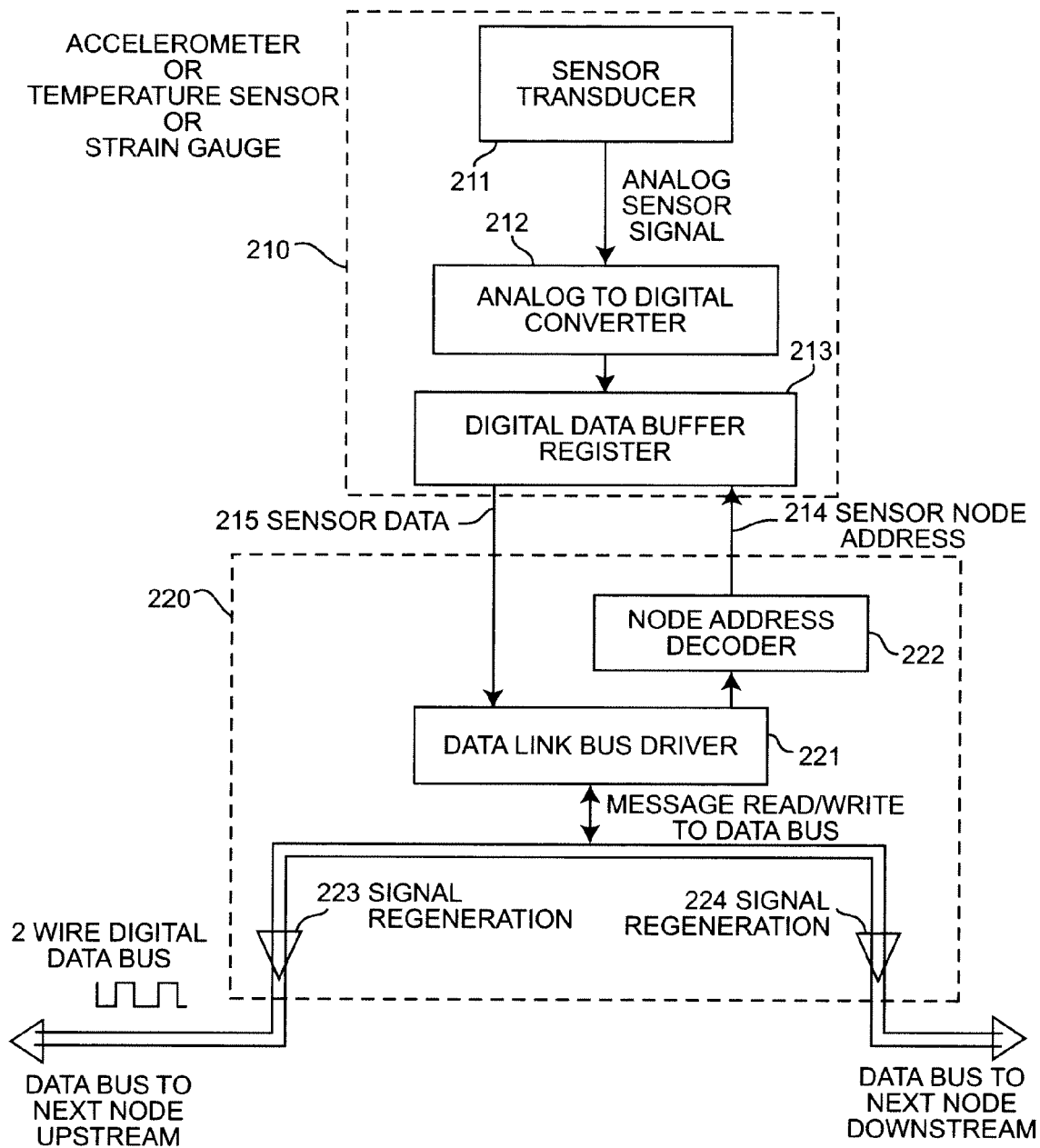
FIG. 2B is a block diagram illustrating functional elements included in the sensor module or node of FIG. 2A

The sensor chip 210 can be any of a number of commercially available semiconductor chips capable of sensing a condition and providing a digital output. As shown in FIG. 2B, such sensor chips preferably include a sensor/transducer 211 for the parameter of interest coupled to an analog-to-digital converter 212 and a data buffer 213 which, when accessed by a signal at connection 214, can read out the currently stored data on connection 215. Such chips including transducers 211 adapted for sensing a particular parameter are commercially available. Alternatively such a chip could provide an analog output with analog-to-digital conversion separately provided (e.g. in communication chip 220).

For temperature sensing, suitable digital thermometer chips are available from Maxim/Dallas Semiconductors, TI-Burr Brown and other semiconductor manufacturers. So-called Micro Electromechanical (MEM) structures which generally operate by sensing relative changes in electrical properties such as resistance or capacitance of mechanically connected elements therein (e.g. electrically connected in a bridge-type circuit) may be used for monitoring strain, pressure and acceleration along 1, 2 or 3 axes and are available from Analog Devices or ST Microelectronics. Similar semiconductors for sensing material incursion and magnetic field suitable for inclusion in the invention are known and commercially available. Typically, strain and pressure sensors may be used as illustrated in FIG. 1B (preferably in combination with temperature sensors indicated by dashed lines) for correction of temperature measurements or to monitor for potential sources of damage to the cable. In static cable installations, strain may also indicate damage during installation, improper or insufficient support or the like. Strain sensors are preferably provided to sense either tension or bending strain and such respective types of sensors may be assembled in the same sensor tube or different, separate sensor tubes. The information thus provided may be particularly useful in regard to underwater cable use since tension is most critical in a so-called riser region between the vessel deploying the cable and the point that the cable is supported by the sea floor or other structure, referred to as the touch point. The touch point can be approximately determined by a relatively sharp cable bend, possibly in combination with a reduction in detected motion and/or relatively constant or at least stable pressure at locations on the cable beyond the touch point. Interrogation and/or monitoring of tensile stress and strain may thus be more concentrated in the riser portion of the cable which is most critical.

Figure 1C:
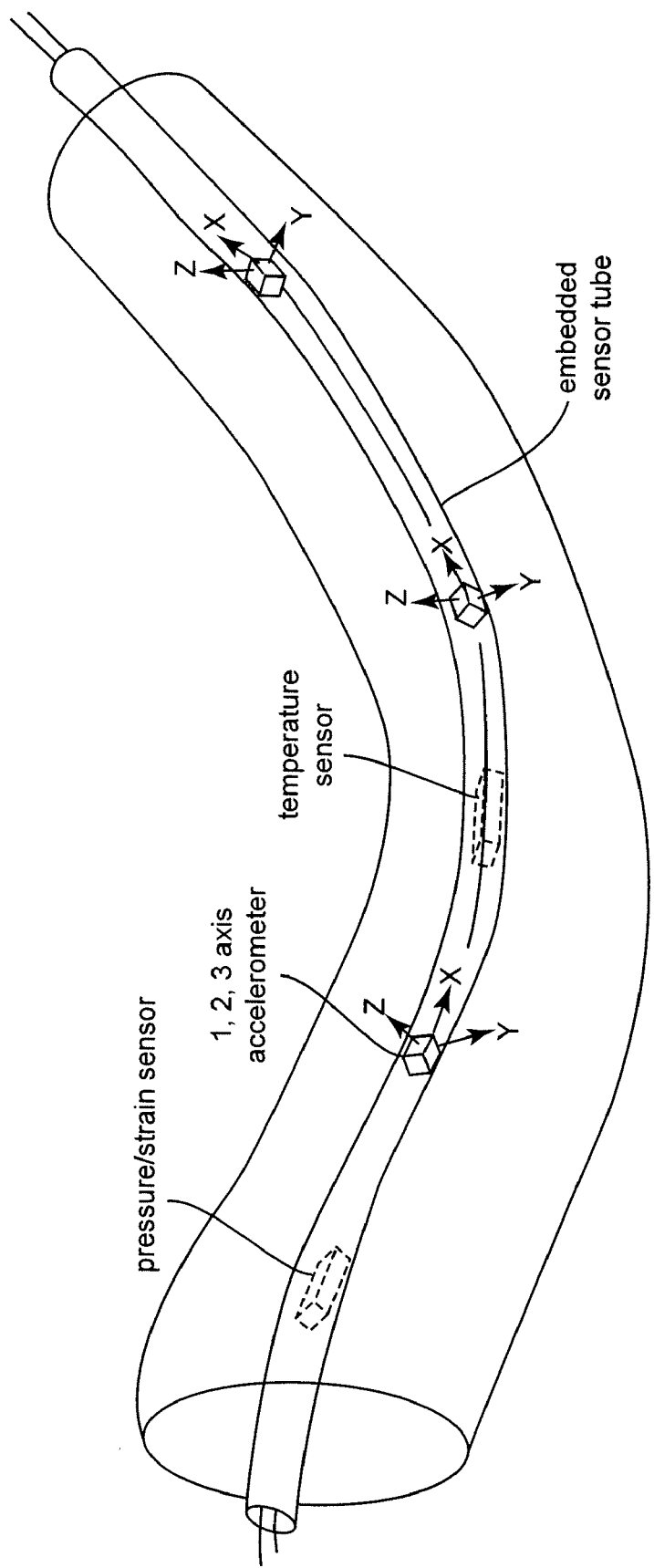
Figure 1D:
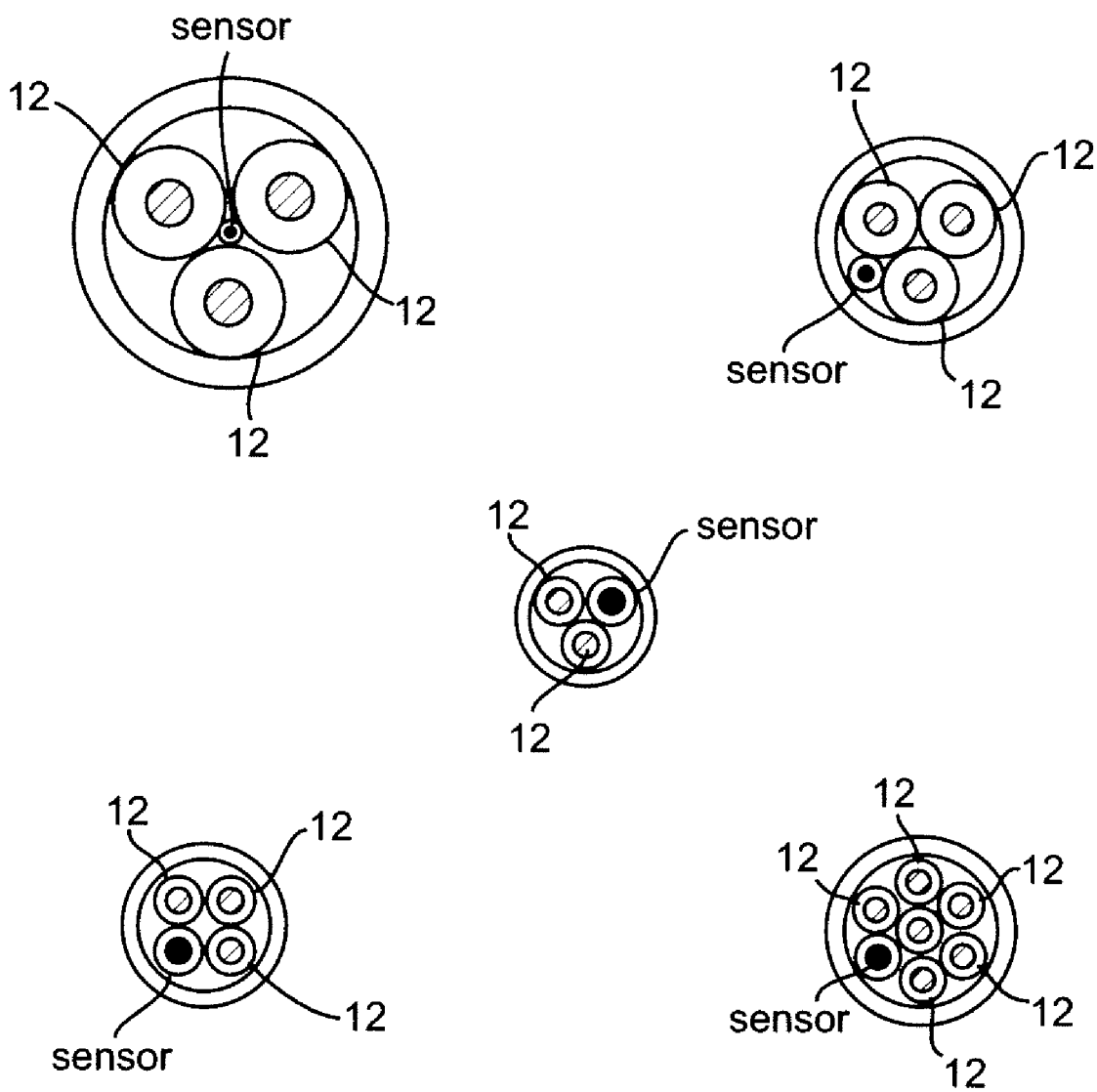
FIG. 1D illustrates some exemplary sensor locations different cable conductor configurations.

Acceleration sensors may be used as illustrated in FIG. 1C (preferably in combination with temperature sensors and possibly pressure/strain sensors, both illustrated with dashed lines) to obtain motion data that can be integrated backward over time to a known location of each sensor so that the shape of the cable may be known in real time, as is often important in underwater applications or where the cable may be subject to distributed dynamic forces that may differ between locations along the cable or where the cable may be twisted over its length and thus tend to wrap upon itself or become entangled with itself or other structures if tension is slackened. Such changes in cable shape or configuration over its length may cause concentration of internally generated heat in much the same manner as winding the cable in layers on a reel as alluded to above. When a cable is moved through a fluid medium as in the case of a towed sonar array or remotely operated vehicle (ROV) or when an undersea cable is being laid, vortex induced vibration (VIV) which may cause potentially violent motion of portions of a cable that may produce metal fatigue or other damage is also of interest and can be detected using accelerometers.

Sensors for detecting material incursion such as abrasive material or an acidic, caustic or conductive fluid (e.g. sea water) may also be used such materials may cause deterioration of dielectric properties of insulation and, over time, other type of damage such as corrosion or even vapor generation that can cause mechanical damage due to rapid rise of internal pressure in the cable. If used, it is desirable to position such sensors at in-line connectors, terminal fittings and/or branching points instead of or in addition to similar sensors along the length of the sensor tube and/or cable.

Sensors for monitoring magnetic field along the cable length can also be useful and used in accordance with the invention. Strong magnetic fields in the environment can interact strongly with magnetic fields induced by large currents in the power conductors 14 and cause motion of the cable. More commonly, however, magnetic field information may be of interest for other reasons during undersea prospecting or salvage for example. However, sensing of a magnetic field may also be useful in determining deployed length of cable from a reel or sheave (e.g. a guide for a cable as it is being unrolled from a reel for deployment, often similar to a pulley) that may include magnets in a reel or sheave of non-magnetic material or have residual magnetism in a reel or sheave of magnetic material or even through distortion of the magnetic field of the earth by ferromagnetic materials such as the hull of the ship from which the cable is deployed. (It is contemplated that a Hall effect device would sense a change in the magnetic field to "set" a circuit which could then be interrogated at a later time or sense and report a change in magnetic field in substantially real time.) It should be noted that the length of cable deployed from a reel often can also be detected by temperature sensors when the cable is delivering power near its capacity by the sharp temperature gradient where the cable leaves a reel or spool (and is thus more readily cooled by ambient atmosphere than when coiled on a reel or spool) or at a water/air interface or both magnetic and thermal sensing may be employed in combination for the purpose. It should be appreciated that such types of measurement of deployed cable length are not subject to errors of prior techniques of determining deployed cable length due to slippage of the cable on cable-handling apparatus, non-level winding on a reel, power interruptions during deployment and the like.

Suitable communications chips or dies 220 are available from numerous sources with a wide range of functionalities. Preferably, as shown in FIG. 2B, a communication chip will include a node address decoder 222 which can detect a particular unique address transferred to it from a data link bus driver/receiver bus interface 221. Alternatively, the function of the node address decoder could be simply a unique delay or the like that can be discriminated in the response to an interrogation signal. That is, as an alternative to separate interrogation of the respective sensor nodes, a common interrogation or synchronization signal can be used to interrogate the entire sensor tube or a section thereof while the delay or the like allows the individual sensors to respond in respective time slots or using a distinct modulation technique or frequency or combination thereof. Some or all communication chips should preferably include upstream and downstream signal repeaters 223 and 224 for signal regeneration, depending on the length of cable intervening between sensor nodes including such repeaters.

More generally, suitable chips or dies should be addressable so that they may be interrogated individually or be capable of transmitting a data packet that will contain an address signal that can uniquely identify a particular sensor along the cable. The communications chips or dies should also have a transmitter and preferably a receiver sufficient for at least synchronization if not interrogation, as is preferred. Alternatively, the transmitters may transmit multiplexed data substantially continuously using frequency division multiplexing or digital pulse code modulation (PCM) using established or foreseeable protocols such as carrier sense multiple access/collision detect (CSMA/CD). The interface may use, for example, the RS485 multi-drop interface, controller area network (CAN), Ethernet or the like. The transmitter and receiver may be adapted to use any known or foreseeable transmission signal modulation/demodulation convention such as phase shift keying (PSK), frequency shift keying (FSK), amplitude shift keying (ASK), quadrature amplitude modulation (QAM) or the like or combinations thereof. It is preferred that encoding/decoding provide for error recovery such as by use of error correcting codes (ECC) such as cyclic redundancy check (CRC) codes. for applications to relatively long cables or noisy environments, it is also preferred that the communications chips include a repeater function to amplify the signal from other sensor nodes or modules at intervals along the length of the cable.

Figure 3:
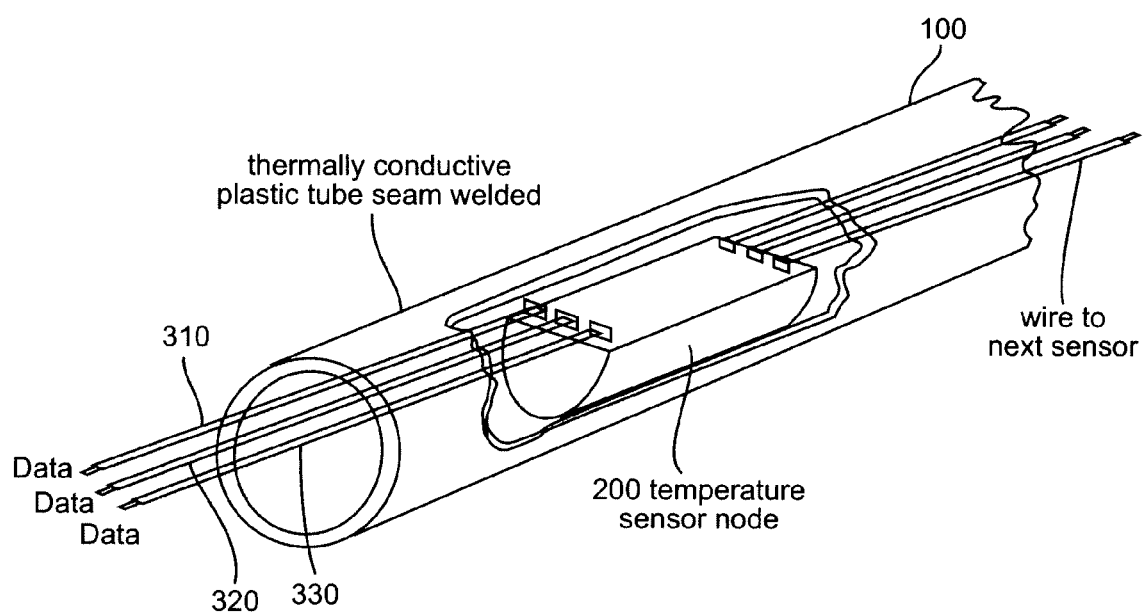
FIG. 3 is an isometric view of a section of sensor tube in accordance with the present invention.

Referring now to FIG. 3 the overall structure of a portion of the sensor array tube 100 is shown. The sensor nodes or module 200 are connected by a preferred minimum of three wires: a data wire 310, a power wire 320, and a reference voltage (e.g. ground) wire 330 for current return and data signal reference. It is possible to transmit power over the data wire but is not preferred due to added complexity and cost without producing significant savings in space. Conversely, separate power and data grounds or a plurality of either or both could be provided if noise is expected to present a problem in a particular cable application but, in practice, is seldom necessary or the expense thereof justified. Since power requirements for the sensor modules or modes is very low only relatively fine wires are needed and 24 AWG to 28 AWG is generally sufficient for lengths of up to several miles and potentially hundreds of sensor nodes. Insulation for wires 310-330 should be of similar properties to those of the insulation 16 of cable conductors 12 but need not be of substantial thickness since only relatively low voltages need be carried.

Figure 4:
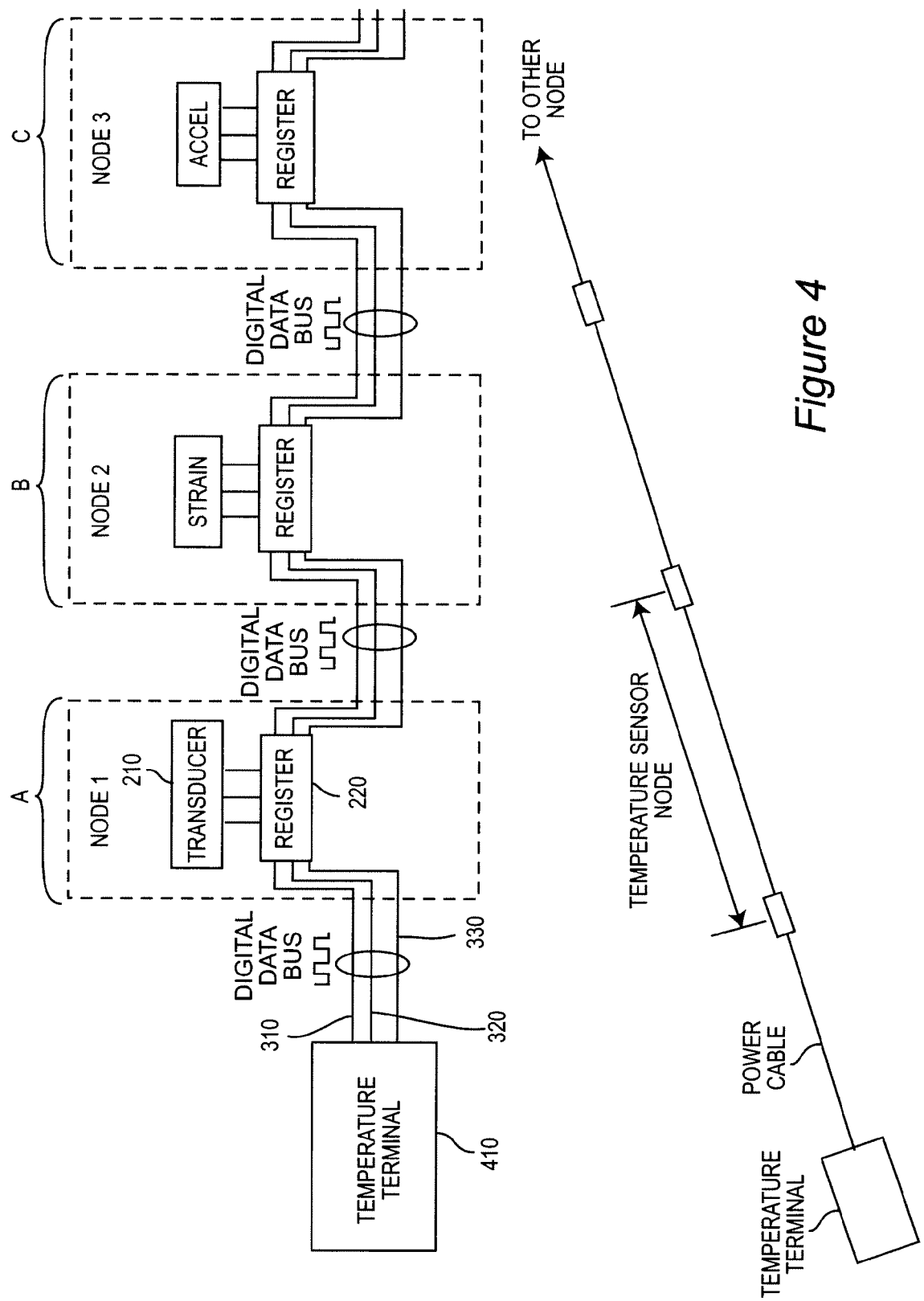
FIG. 4 illustrates a generic sensor array schematic in accordance with the invention, FIG. 5 schematically illustrates a preferred method for constructing the sensor tube in accordance with the invention.

Fully assembled, a schematic of the sensor array is substantially as shown in FIG. 4. Three sensor nodes A, B and C are shown connected by wires 310-330 as described above. Each node A, B, and C is directed to sensing one of temperature, pressure/strain and/or acceleration and may be located any desired distance apart depending upon the desired resolution of condition monitoring along the length of cable 10. Wires 310-330 are further connected at an end of the sensor array to a terminal 410 which includes a receiver, a transmitter if interrogation is to be performed, data acquisition electronics including a demodulator, decoder, error correction processing, storage, alarm limit threshold comparators and the like for each of the conditions monitored. If more than one condition is monitored, processing for combinations of conditions is preferably provided to determine particular circumstances that may contribute to or increase likelihood of cable failure. Suitable processing hardware and software is commercially available and will be evident to those skilled in the art.

Thus, localized conditions can be continuously monitored over the entire length of the cable so that the cable can be operated to deliver power at its full capacity or somewhat above its capacity in some favorable conditions. For example, if the cable is operated to deliver power to a submersible remotely operated vehicle (ROV), heat dissipation from the cable may be enhanced by cold ambient fluid sufficient to allow operation of the cable above design capacity. Conversely under adverse conditions or following damage to the cable, the cable can still be operated at its full capacity although possibly derated somewhat from its design capacity. More generally, weather, ambient conditions, cable configuration and the amount of cable deployed (e.g. wound on or unwound from a reel) may increase or restrict the amount of current that may be carried but the cable may still be operated at full or substantially full capacity in consideration of any or all of those conditions. Conversely, any condition which is likely to compromise the operability of the cable or be a precursor to cable failure can be monitored and electrical current in the cable reduced in order to avoid cable failure, thus avoiding a need to design extra capacity into the cable to mitigate the risk of failure; allowing the cable design and cable handling structures to be optimized in regard to size, weight, cost and the like without significantly risking cable failure.

Figure 5:
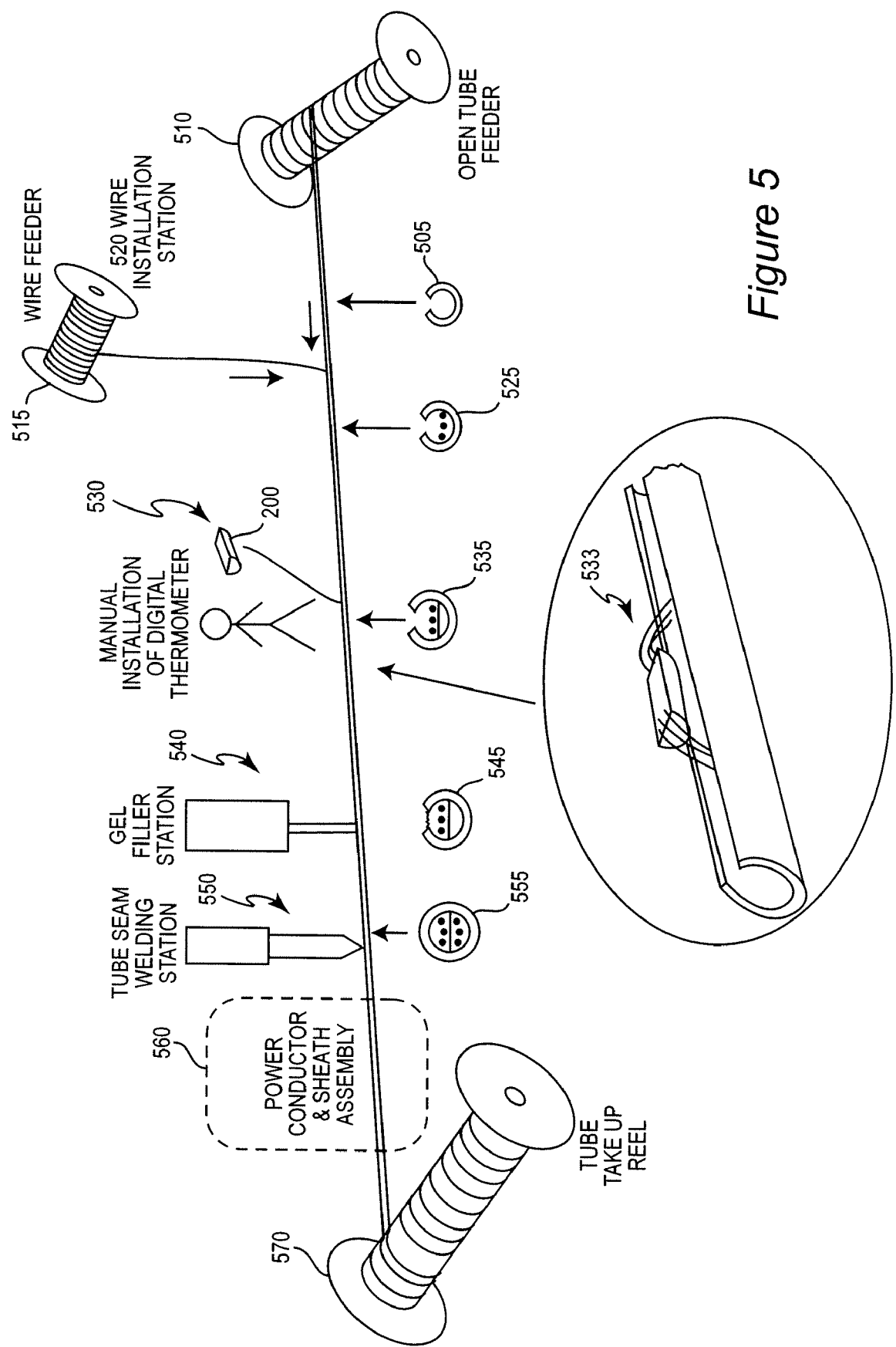
Figure 6:
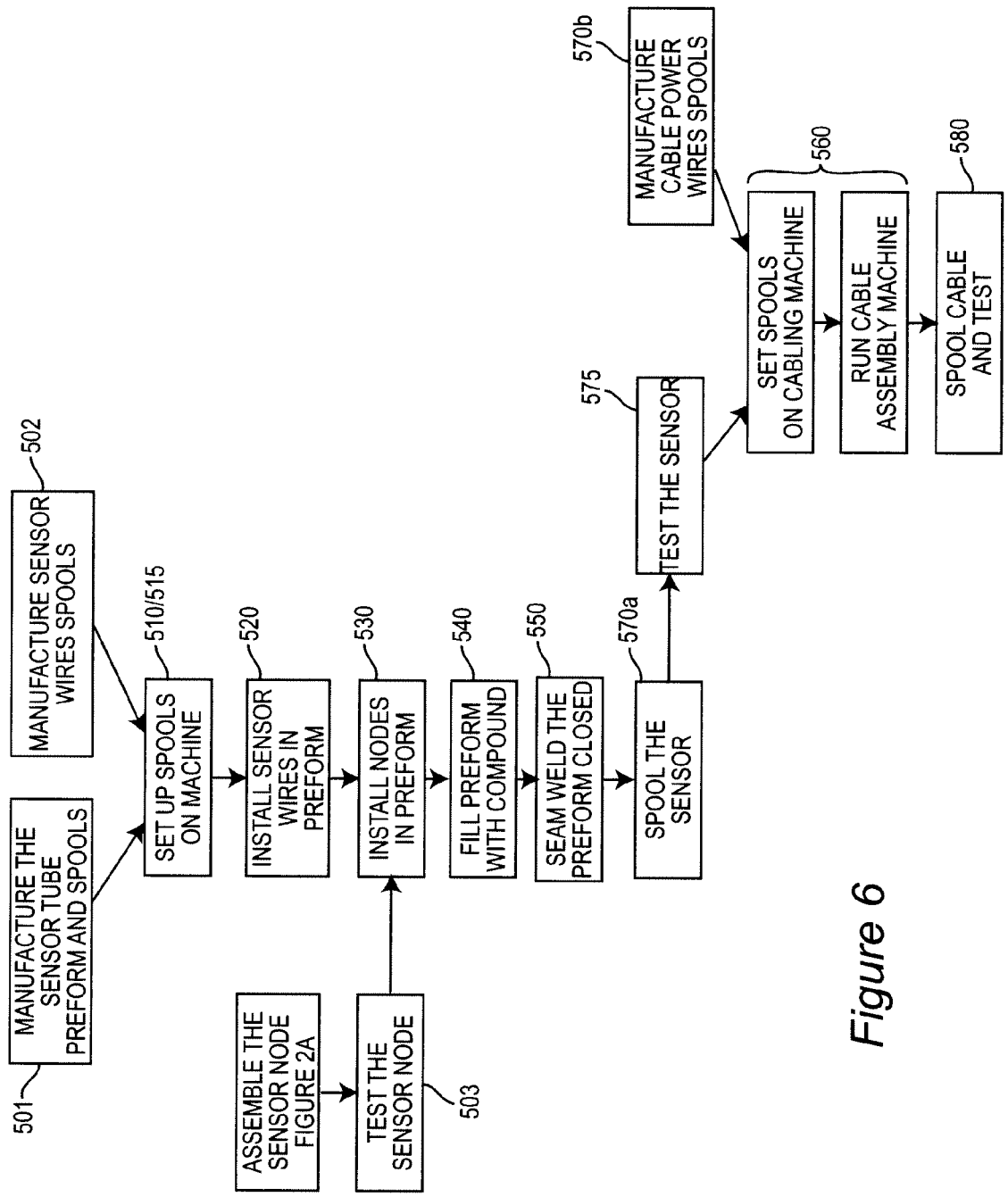
FIG. 6 is a flow chart illustrating in greater detail the method schematically illustrated in FIG. 5.

Referring now to FIGS. 5 and 6, a preferred method for constructing the sensor array and/or the completed cable as shown in FIG. 1 will now be discussed. The process begins with manufacture and spooling of the tube preform 501 and the manufacture and spooling of the sensor wires 502 to provide a supply 510 of open tube preform for forming tube 100 (a cross-section of which is shown at 505) and a supply 515 of the wire triad 310-330 which is inserted into the tube at wire installation station 520, resulting in the cross-section shown at 525. The assembled tube preform and wire then passes to a technician who withdraws a short section of wire from the tube preform and attaches the wires to respective wire terminals 240 of sensor modules or nodes 200 at manual assembly station 530. Automated assembly is also possible but not preferred due to the complexity of machinery required for operation on parts of such small size. The wires can be cut either before or after such attachment as may be preferred. Attachment may be performed by soldering, crimping or insulation displacement terminals. This operation results in the structure shown in inset 533 and cross-section shown at 535 when the sensor node is placed into the tube preform. The technician repeats the operation at desired intervals along the length of the wires. Depending on the application and criticality of monitoring resolution, intervals of between one hundred millimeters and one kilometer may be appropriate.

The remainder to the tube preform is then preferably filled with a gel, elastomer plastic or the like as alluded to above at gel-filling station 540, resulting in cross-section 545. The opening in the tube preform can then be seam welded to complete the sensor array tube 100. At this point the completed sensor array tube can be wound onto a reel 570 for later assembly with power conductors 12 as shown at 570*a* for later assembly with the remainder of the cable structure as shown at 570*b* or directly assembled (e.g. wound) with such conductors and a sheath 20 applied and the completed cable wound on reel 570; both of which alternatives are intended to be schematically depicted at 560. In general, it is preferable to perform testing after the sensor tube is spooled as shown at 575 since a plurality of regions of altered temperatures along the length of the sensor tube may be more easily concurrently generated for testing. Also, any defect discovered would likely be repaired at a different facility, location or apparatus including only a repair station.

In view of the foregoing, it is seen that the sensor array structure is highly robust, resistant to damage or electrical failure and capable of monitoring virtually any desired condition with any desired degree of spatial resolution. The sensor modules or nodes are of a sufficiently small dimension and mass that neither size nor weight of the final cable is significantly increased. Cost of the cable is not significantly increased other than by the cost of the manual attachment of sensor modules or nodes to the data, power and ground wires; which cost is more than offset by the capability for optimization of cables for high-performance applications and the reduction of size weight and cost of equipment to install and/or manipulate the cable as well as the reduced cost of materials in the optimized cable. Further, the trade-off between excess ampacity and reliability of the cable can be well-managed since the information provided by the sensor array in accordance with the invention can allow prevention of cable failure.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A sensor array comprising
   a tube, and
   a plurality of sensor nodes spaced from each other along a length of said tube, said sensor nodes being connected by wires for carrying signals to and from said sensor nodes and providing power to said sensor nodes, wherein each sensor node includes
   a semiconductor condition sensor chip and a semiconductor communication chip,
   a substrate for attachment and interconnection of said semiconductor sensor chip and said semiconductor communication chip,
   terminals for connecting said wires for carrying signals to and from said sensor nodes and providing power to said sensor nodes, and
   encapsulation material for encapsulating said substrate and said semiconductor sensor chip and said semiconductor communication chip.

2. The sensor array as recited in claim 1 further including flexible material filling spaces between said sensor nodes within said tube.

3. The sensor array as recited in claim 1 wherein said semiconductor condition sensor chip is adapted to measure at least one of temperature, acceleration and strain.

4. The sensor array as recited in claim 1 wherein said semiconductor communication chip includes
   a node address decoder, and
   a repeater for signal regeneration.

5. The sensor array as recited in claim 1, wherein said wires for carrying signals to and from said sensor nodes and providing power to said sensor nodes comprise
   a signal wire,
   a power wire, and
   a reference voltage wire.

6. A power delivery cable comprising
   at least two power conductors, and
   a sensor array extending along said at least two power conductors, said sensor array comprising a plurality of sensor nodes connected by a data bus wire, a power supply wire and a reference voltage wire, said data bus wire, said power supply wire and said reference voltage wire being distinct from said at least two power conductors, wherein each sensor node includes a semiconductor condition sensor and a semiconductor communication chip.

7. The cable as recited in claim 6 further including flexible material filling spaces between said sensor nodes within a tube.

8. The cable as recited in claim 6 wherein said semiconductor condition sensor chip is adapted to measure at least one of temperature, acceleration and strain.

9. The cable as recited in claim 6 wherein said semiconductor communication chip includes
   a node address decoder, and
   a repeater for signal regeneration.

10. The cable as recited in claim 6, wherein said sensor node includes
    a substrate for attachment and interconnection of said semiconductor sensor chip and said semiconductor communication chip,
    terminals for connecting said databus wire, said power supply wire and said reference voltage wire, and
    encapsulation material for encapsulating said substrate and said semiconductor sensor chip and said semiconductor communication chip.

11. The cable as recited in claim 6 wherein said sensor array approximates one of said power conductors in size.

12. The cable as recited in claim 6 wherein said sensor array is located in a space between said power conductors in said cable.

13. The cable as recited in claim 6 wherein said cable further includes at least one of electrical shielding, mechanical shielding and tensile reinforcement.

14. A method of making a sensor array for monitoring a condition of a cable, said method comprising steps of
    installing wires for carrying signals to and from sensor nodes and providing power to sensor nodes in a tube preform,
    withdrawing a portion of said wires for carrying signals to and from said sensor nodes and providing power to said sensor nodes from said tube preform,
    attaching terminals of a sensor node to said wires for carrying signals to and from said sensor nodes and providing power to said sensor nodes,
    cutting said wires between said terminals of said sensor nodes,
    placing said sensor node and said portion of said wires for carrying signals to and from said sensor nodes and providing power to said sensor nodes within said tube preform, and
    sealing said tube preform to form a tube containing said sensor node and said wires for carrying signals to and from said sensor nodes and providing power to said sensor nodes.

15. The method as recited in claim 14 including the further step of
    placing a flexible material in said tube preform prior to said sealing step.

16. The method as recited in claim 14 wherein said wires for carrying signals to and from said sensor nodes and providing power to said sensor nodes include
    a signal wire,
    a power wire, and
    a reference voltage wire.

17. A method of managing risk of failure of a power delivery cable, said method comprising steps of
    passing an electrical current through said power delivery cable,
    monitoring at least two conditions of temperature, acceleration, strain, material incursion, deployed length and magnetic field strength at a plurality of locations in said power delivery cable using a semiconductor sensor chip at each said location,
    communicating results of said monitoring step using electrical signals communicated by a semiconductor communications chip at each said location, and
    reducing said electrical current in said power delivery cable in accordance with a parameter measured in said monitoring step.

18. The method as recited in claim 17 wherein strain is included in said step of monitoring and wherein strain at a touch point and riser portion of said cable are monitored.

19. The method as recited in claim 17 wherein acceleration is included in said step of monitoring whereby entanglement or velocity induced vibration of said cable are detected by said monitoring of acceleration.

20. The method as recited in claim 17 wherein material incursion is included in said monitoring step and said material incursion monitoring detect detects water incursion in in-line connectors and branching points as well as at said plurality of locations.

21. The method as recited in claim 17 wherein said monitoring of a magnetic field is performed using Hall effect sensors.

22. The method as recited in claim 21, wherein said Hall effect sensors monitor deployed length of said cable.

* * * * *